Figure 1:
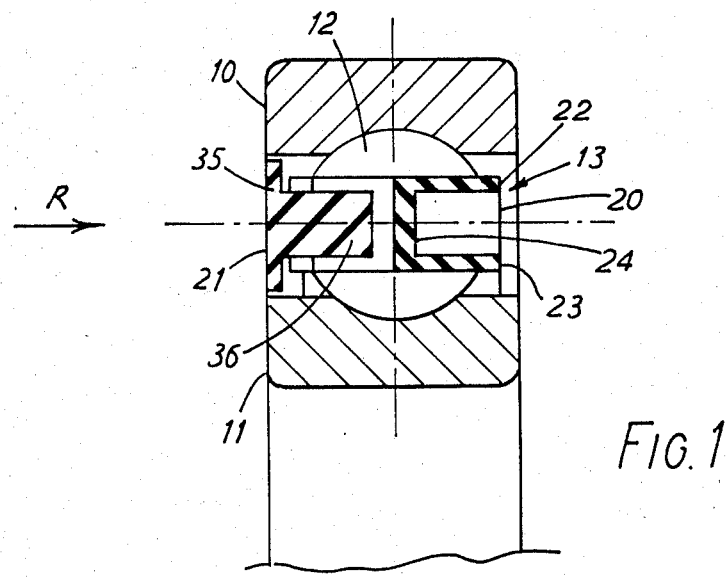

United States Patent [19]

Forknall et al.

[11] Patent Number: 4,626,113
[45] Date of Patent: Dec. 2, 1986

[54] CAGE FOR A RADIAL BALL BEARING

[75] Inventors: John P. Forknall, Dunstable; Keith W. Woodbridge, Luton, both of England

[73] Assignee: SKF (U.K.) Limited, Luton, England

[21] Appl. No.: 713,575

[22] Filed: Mar. 18, 1985

[30] Foreign Application Priority Data

Apr. 4, 1984 [GB] United Kingdom ................. 8408678

[51] Int. Cl.⁴ ....................... F16C 33/38; F16C 33/44
[52] U.S. Cl. ..................................... 384/530; 384/526
[58] Field of Search ............................... 384/523–534, 384/572–580, 470, 477, 478, 484

[56] References Cited

U.S. PATENT DOCUMENTS

| 851,697 | 4/1907 | Schneider | 384/526 |
| 2,861,849 | 11/1958 | Case | 384/527 |
| 3,554,621 | 1/1971 | McAllister | 384/527 X |
| 3,586,405 | 6/1971 | Claesson | 384/526 |
| 3,784,268 | 1/1974 | De Gioia et al. | 384/478 |
| 4,126,362 | 11/1978 | Hamblin et al. | 384/526 |
| 4,278,307 | 7/1981 | Olschewski | 384/526 |
| 4,324,444 | 4/1982 | Buczynski et al. | 384/526 |

FOREIGN PATENT DOCUMENTS

| 2721900 | 11/1978 | Fed. Rep. of Germany | 384/527 |
| 470612 | 6/1914 | France | 384/523 |
| 1104870 | 6/1955 | France | 384/530 |
| 20389 | of 1910 | United Kingdom | 384/532 |
| 22260 | of 1911 | United Kingdom | 384/523 |
| 1370890 | 10/1974 | United Kingdom | 384/527 |

Primary Examiner—Stuart S. Levy
Assistant Examiner—Thomas R. Hannon
Attorney, Agent, or Firm—Browdy & Neimark

[57] ABSTRACT

A cage for a radial ball bearing comprises an annular body of resilient material formed with pockets for reception of the balls as a snap fit and prongs for guiding the balls into the pockets when the annular body is fitted in the bearing from a side thereof. A retainer ring is mounted on the guide prongs to maintain the same cord distance between the prongs and thereby restrict deformation of the annular body so as to prevent ejection of the annular body under the ball-to-cage contact forces in the operation of the bearing.

14 Claims, 17 Drawing Figures

CAGE FOR A RADIAL BALL BEARING

This invention relates to cages for separating the balls of a radial ball bearing.

Radial ball bearings are commonly fitted with cages of the snap-on type having pockets with mouths which open to one side of the cage for reception of the balls as a snap-fit when the cage is introduced into the bearing from a side thereof. Such cages are normally made of resilient plastics material. Plastics cages of the snap-on type fitted to deep-groove radial ball bearings are however susceptible to ejection from or displacement in the bearing when used in environments in which there is high contact forces between the balls and the cage, such as occurs for example as a result of ingress of dirt particles into the bearing, or high grease pressure within the bearing, or when the cage is in contact with water.

It is known, for example from British patent specifications Nos. 2 126 288, 2 080 889, 2 078 874, 2 018 913, 1 558 378, 1 557 316, 1 217 095, 1 154 797, to provide a bearing cage in two separate parts which are secured together and which co-operate with one another to form the pockets for the balls. With suitable fastening means there is no risk of the cage being ejected or displaced due to high ball-to-cage contact forces, but such cages are costly to manufacture and/or assemble.

The object of the invention is to provide a cage which can be of simple construction but which is particularly adapted to withstand high ball-to-cage contact forces and centrifugal forces without ejection or displacement in a bearing.

According to the present invention there is provided a cage for separating the balls of a radial ball bearing, comprising an annular body formed with pockets having mouths which open to one side of the annular body for reception of the balls when the annular body is fitted into the bearing from a side thereof, and a retainer ring adapted to be mounted on said one side of the annular body to retain the annular body in the bearing during operation thereof, wherein the annular body is formed of resilient material, the mouths of the pockets in the annular body have a width less than the diameter of the balls, the annular body is deformable by the force between the balls and the mouths of the pockets upon fitting the annular body into the bearing so as to enlarge said mouths for introduction of the balls into the pockets as a snap fit, and the retainer ring when mounted on the annular body restricts deformation of the annular body so as to prevent disengagement of the annular body from the balls due to the contact forces between the balls and the annular body during operation of the bearing.

In the operation of a radial ball bearing fitted with the cage of the invention, the forces tending to separate the retainer ring from the annular body are substantially less than the ball-to-cage forces acting on the annular body, and the retainer ring can conveniently be connected to the annular body by a snap-fastening connection.

In a preferred construction of the cage of the invention the annular body is formed on one side thereof with a plurality of flexible flanges arranged in pairs spaced around the body and a guide prong between each pair of flanges, each pair of flanges defining the walls of one of the pockets at the mouth thereof and the guide prongs being arranged to guide the balls into the pockets upon fitting of the annular body into the bearing.

Upon fitting of such cages to a ball bearing, the walls of the pockets opposite the mouths thereof flex upon engagement of the flanges with the balls, when the body is fitted on a ball bearing, and thereby cause the flanges to splay apart and permit passage of the balls through the mouths of the pockets. In the cage of the invention the retainer ring may be formed with slots adapted to receive the guide prongs as a snap-fit, or with teeth adapted to engage as a snap-fit in recesses in the guide prongs, or the retainer ring may be mounted in recesses in the radially outer surfaces of the guide prongs, so that the hoop strength of the retainer ring is utilized to maintain the same cord distance between the guide prongs, thereby preventing splaying of the mouth of the ball pockets. The retainer ring, in addition, is preferably arranged to engage against the flanges to prevent or restrict flexure of the flanges and walls of the ball pockets and thereby lock the balls in the pockets.

When the cage of the invention is fitted in a radial ball bearing having inner and outer bearing rings rotatably mounted relative to one another by the balls, the retainer ring preferably has a radial width equal to or slightly greater or less than the radial gap between the two bearing rings, so that the retainer ring acts as a shield or seal to restrict or prevent ingress of dirt into the bearing. Moreover the retainer ring will also protect the annular body from the direct pressure of injected grease which, without the protection of the retainer ring, would impinge directly on the open side of the cage and tend to eject the body of the cage from the bearing.

The annular body of the cage of the invention may if desired be used alone in a bearing which is not being subjected to high ball-to-cage contact forces or centrifugal forces. The retainer ring can then easily be fitted in the event of the bearing being used in more arduous conditions.

Figure 2:
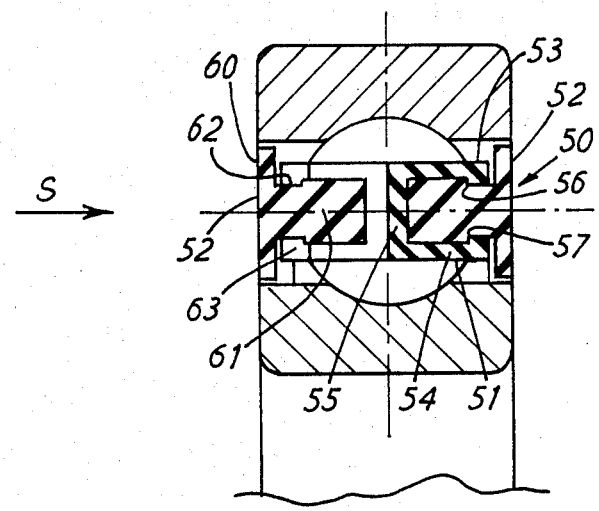
Figure 3:
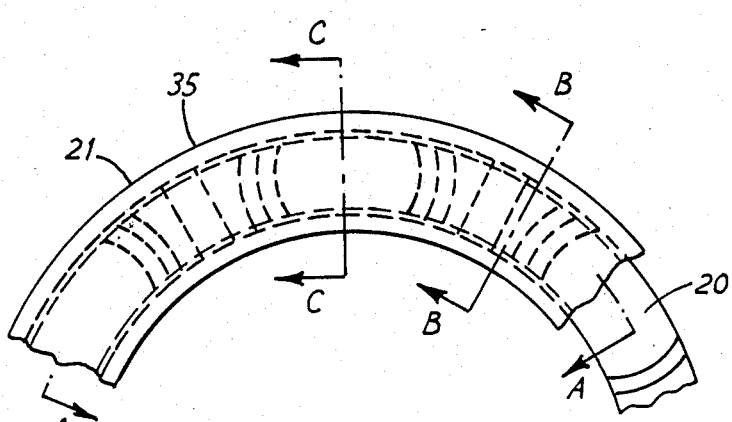
Figure 4:
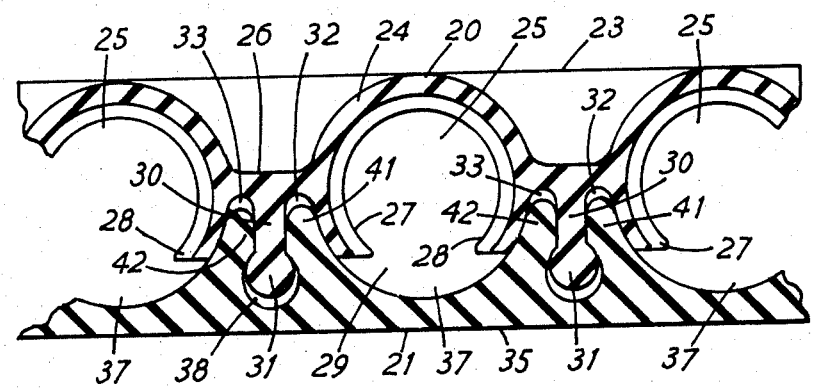
Figure 5:
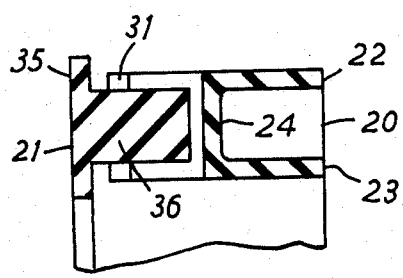
Figure 6:
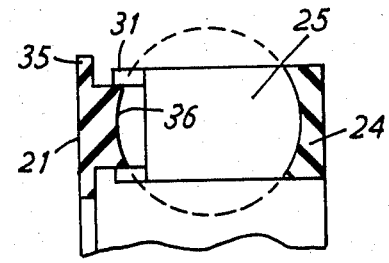
Figure 7:
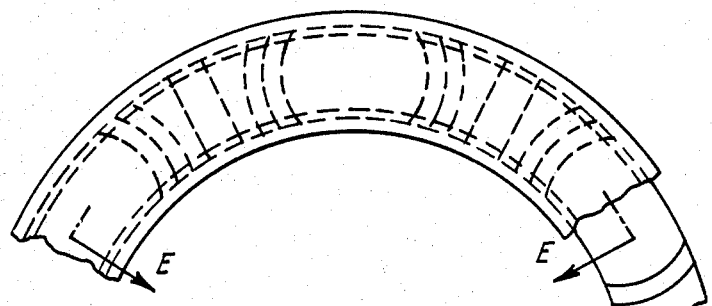
Figure 8:
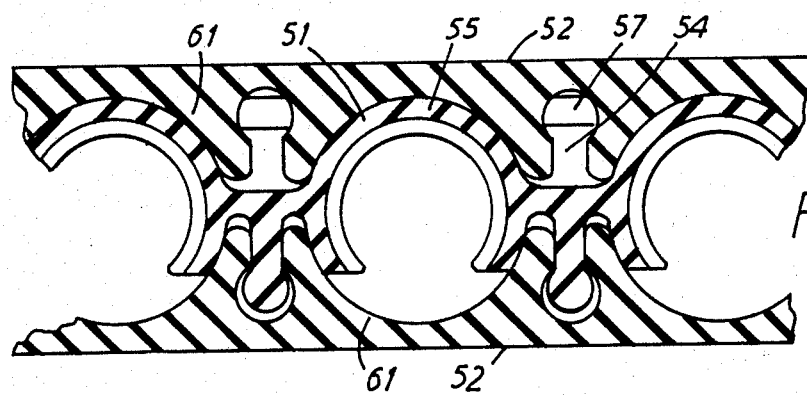
Figure 9:
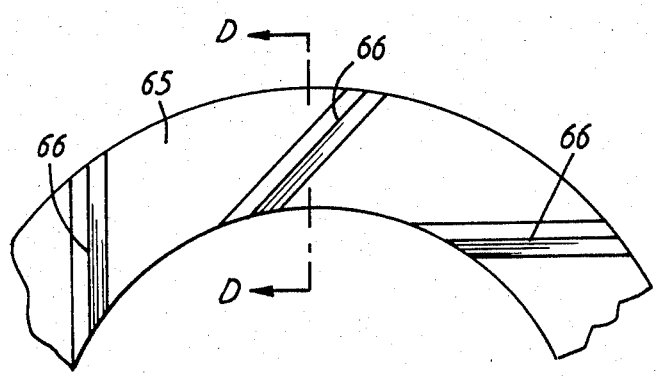
Figure 10:
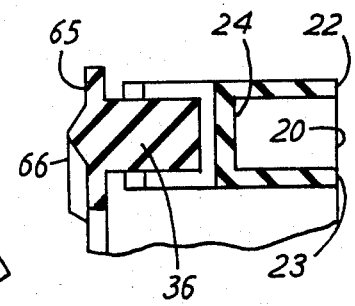
Figure 11:
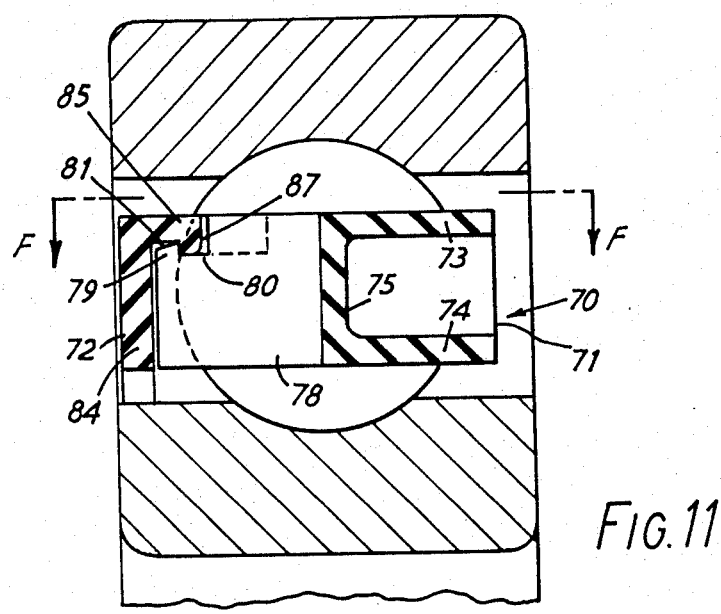
Figure 12:
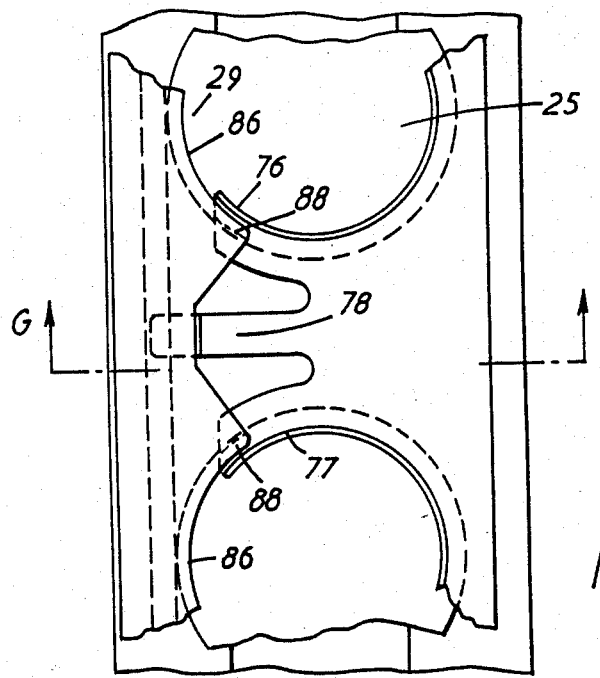
Figure 13:
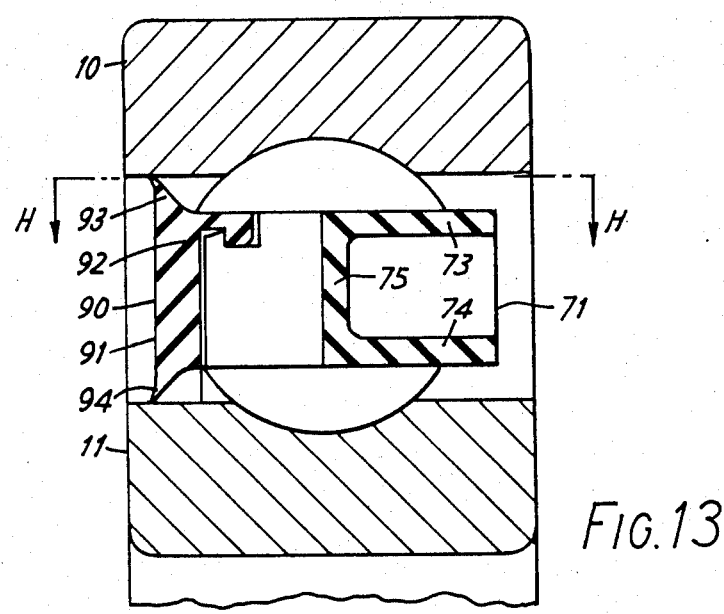
Figure 14:
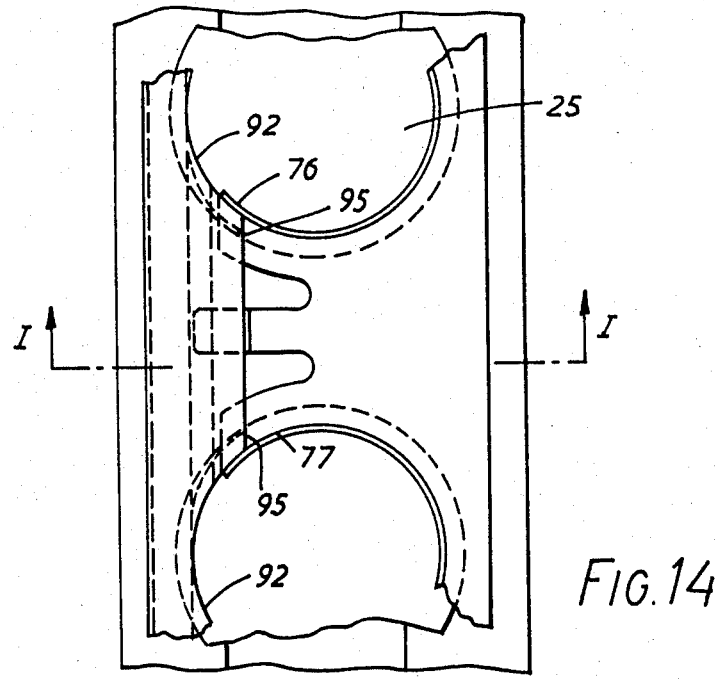
Figure 15:
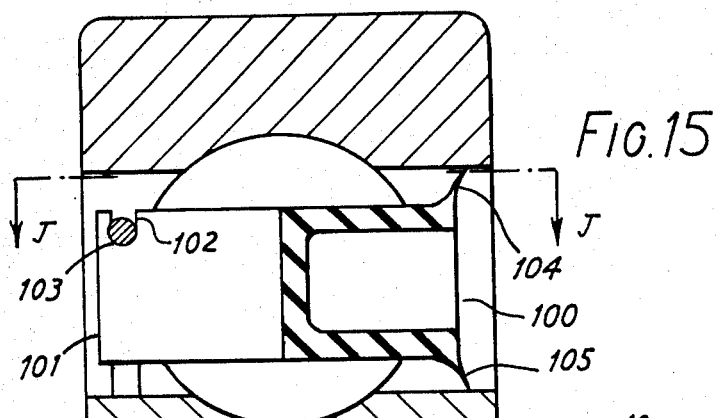
Figure 17:
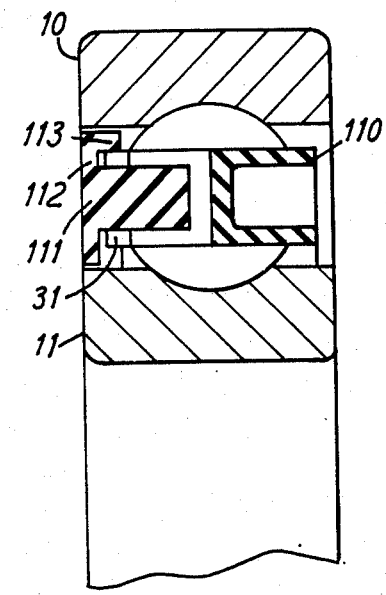
Figure 16:
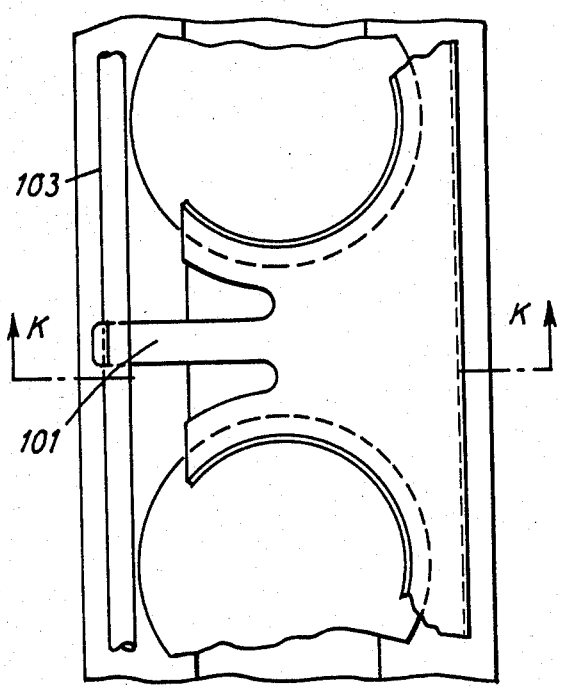

Embodiments of the invention will now be described, by way of example, with reference to the accompanying drawings, in which:

FIG. 1 is a cross-section of a ball bearing fitted with one construction of cage in accordance with the invention, FIG. 2 is a cross-section of a ball bearing fitted with another construction of cage in accordance with the invention, FIG. 3 is a side elevation of part of the cage in the bearing shown in FIG. 1, taken in the direction of arrow R in FIG. 1, FIG. 4 is a circumferential sectional view of the cage of FIG. 3, taken along the line A—A in FIG. 3, FIG. 5 is a cross-section of the cage of FIG. 3 taken along the line B—B in FIG. 3, FIG. 6 is a cross-section of the cage of FIG. 3 taken along the line C—C in FIG. 3, FIG. 7 is a side elevation of part of the cage in the bearing shown in FIG. 2, taken in the direction of the arrow S in FIG. 2, FIG. 8 is a circumferential sectional view of the cage of FIG. 7, taken along the line E—E in FIG. 7, FIG. 9 is a side view of part of a modified construction of the cage shown in FIG. 1 and FIGS. 3–6, FIG. 10 is a cross-section of the cage of FIG. 9 taken along the line D—D in FIG. 9, FIG. 11 is a cross-section of a ball bearing fitted with a further construction of cage in accordance with the invention, the cross-section being taken along the line G—G in FIG. 12, FIG. 12 is a sectional view of the ball bearing and cage of FIG. 11 taken along the line F—F, FIG. 13 is a cross-section of a ball bearing fitted with a modified construction of the cage shown in FIG. 11, the cross-section being taken along the line I—I in FIG. 14, FIG. 14 is a sectional view of the ball bearing and cage of FIG. 13 taken along the line H—H in FIG. 13, FIG. 15 is a cross-section of a ball bearing fitted with another construction of cage in accordance with the invention, the cross-section being taken along the line K—K in FIG. 16, FIG. 16 is a sectional view of the ball bearing and cage of FIG. 15 taken along the line J—J in FIG. 15, and FIG. 17 is a cross-section of a ball bearing fitted with a modified construction of the cage shown in FIG. 1.

The ball bearing shown in FIG. 1 comprises an outer bearing ring 10 rotatably mounted on an inner bearing ring 11 by a plurality of balls 12 in rolling engagement with grooved tracks on the two bearing rings, and an annular cage 13 located in the space between the two bearing rings and separating the balls from one another.

As shown in FIG. 4, the cage 13 comprises an annular body 20 and a retainer ring 21, both of which are mouldings of resilient plastics material. The annular body 20 has a radially outer cylindrical wall 22 (FIG. 1), a radially inner cylindrical wall 23, and an end wall 24 which extends between the two cylindrical walls 22, 23 and which is shaped to define a plurality of pockets 25 (FIG. 4) spaced at equal intervals around the annular body, the number of pockets being equal to the number of balls and each pocket being of a size to receive a separate one of the balls as a loose running fit. The part of the wall 24 defining each pocket 25 is part-spherical so as to conform substantially to the spherical surface of a ball, and each pocket is open at one side of the annular body, and also open at the radially outer periphery and the radially inner periphery of the annular body. The two cylindrical walls 22, 23 conform to the contour of the end wall 24 and extend from the end wall to the side of the annular body opposite to the side to which the pockets open. The parts of the end wall 24 between the pockets 25 are in the form of webs 26 lying in the radial plane through the centres of the pockets, and the parts of the wall 24 defining the open side of each pocket consist of two opposing flanges 27, 28. The flanges 27, 28 of each pocket define a mouth 29 for the pocket, and the wall 24 of the annular body opposite the mouth 29 flexes when the flanges 27, 28 are forced against one side of a ball so that the flanges 27, 28 move away from one another and permit the ball to pass through the mouth 29 into the pocket, the resilience of the annular body causing the flanges 27, 28 to spring back and embrace the ball when it is received in the pocket, so that the ball is a snap fit within the pocket. There is also a slight flexure of the flanges 27, 28 away from one another when they are forced against one side of the ball and this movement assists in permitting passage of the ball into the pocket. Each of the webs 26 between the pockets 25 is formed with a guide prong 30 which projects axially away from the web on the side of the annular body having the mouths of the pockets 25, the guide prongs 30 extending between the radially outer and radially inner peripheries of the annular body and the free end of each prong having a cylinder-shaped enlargement 31. Each of the flanges 27 is spaced from the adjacent guide prong 30 to define a recess 32 which permits flexure of the flange 27 away from the centre of the associated pocket 25 when the annular body of the cage is fitted on the balls, and similarly each of the flanges 28 is spaced from the adjacent guide prong 30 to define a recess 33 which permits flexure of the flange 28 away from the centre of the associated pocket 25.

The retainer ring 21 comprises an annular disc 35 (FIG. 1) having a radial width slightly less than that of the annular gap between the bearing rings 10, 11, the disc 35 being formed on one side with an axially extending annular portion 36 having a radial width less than that of the annular body 20. The annular portion 36 is shaped at the free end thereof to define a plurality of arcuate recesses 37 (FIG. 4) spaced at equal intervals around the retainer ring, the number of recesses 37 being equal to the number of pockets 25 in the annular body of the cage. The annular portion 36 of the retainer ring is also shaped to define slots 38 extending between the radially outer and radially inner peripheries of the annular portion 36, one slot 38 being provided between each pair of the arcuate recesses 37. The slots 38 conform approximately in shape to that of the guide prongs 30, so that each slot 38 has a narrow entrance and an enlarged inner cylindrical chamber. The slots 38 are thus adapted to receive the guide prongs 30 as a snap fit. Moreover, each slot divides the part of the annular portion 36 between the adjacent arcuate recesses 37 into two projections 41, 42. The projections 41 conform in shape approximately to that of the recesses 32 on the annular body of the cage, and the projections 42 conform in shape approximately to that of the recesses 33 on the annular body, so that when the guide prongs 30 are engaged as a snap fit in the slots 38 in the retainer rings 31, the projections 41, 42 engage against and support the flanges 27, 28.

The cage 13 is fitted to the ball bearing by first positioning the annular body 20 alongside the bearing with the mouths 29 of the pockets facing the balls 12, and then introducing the annular body 20 into the annular gap between the bearing rings 10, 11. If the balls are not evenly spaced around the bearing rings and positioned opposite the pockets 25, the guide prongs 30 engage the balls and move them around the bearing rings into positions in which each ball is aligned with the mouth 29 of a pocket in the annular body. The annular body is then pressed into the bearing so that the flanges 27, 28 engage the sides of the balls and the flanges 27, 28 of each pocket are forced away from one another. The balls pass through the mouths 29 of the pockets and the flanges 27, 28 spring back when the balls are centered in the pockets. The retaining ring 21 is then positioned alongside the bearing on the opposite side to that fitted with the body of the cage, the retainer ring being arranged with the arcuate recesses 37 facing the balls 12. The retainer ring is then introduced into the annular gap between the bearing rings 10, 11. The projections 41, 42 opposite each guide prong 30 are forced apart by the enlarged end of the guide prong, and spring back under their own resilience when the enlarged end of the guide prong enters the chamber at the inner end of the slot 38 between the projections 41, 42. When the guide prongs 30 are fully engaged in the slots 38, the projections 41, 42 engage against the flanges 27, 28 defining the mouths of the pockets.

The cage 13, when assembled on a ball bearing, cannot be dislodged by inter-ball forces resulting from contamination of the bearing or circumferential forces exerted by the balls, since the projections 41, 42 on the retainer ring 21 prevent the flanges 27, 28 flexing away from one another and thereby lock the balls in the pockets. The retainer ring 21 of the cage, which is spaced close to the bearing rings 10, 11, also acts as a shield to prevent entry of foreign matter into the bearing from the side fitted with the retainer ring.

The ball bearing shown in FIG. 2 is fitted with a cage 50 which comprises an annular body 51 and two identical retainer rings 52 fitted one in each side of the bearing. The annular body 51, which is shown in more detail in FIGS. 7 and 8, is similar in construction to the annular body 20 of the cage in FIG. 1 and comprises an outer cylindrical wall 53, an inner cylindrical wall 54, and an end wall 55. The outer cylindrical wall 53, which corresponds to the cylindrical wall 22 of the cage of FIG. 1, is however formed with an inwardly projecting lip 56 at the side remote from the end wall 55, and the inner cylindrical wall 54, which corresponds to the cylindrical wall 23 of the cage of FIG. 1, is formed with an outwardly projecting lip 57 at the side remote from the end wall 55. Each of the retainer rings 52 is similar in construction to the retainer ring 21 of the cage in FIG. 1 and comprises an annular disc 60 formed on one side with an axially extending annular portion 61 which corresponds to the annular portion 36 of the cage in FIG. 1. The annular portion 61 is however formed with annular recesses 62, 63 on its outer and inner peripheries respectively, the recess 62, 63 being adapted to receive the lips 56, 57 as a snap fit when the retainer ring 52 is inserted between the cylindrical walls 53, 54 as shown in FIG. 8.

In the ball bearing of FIG. 2, the annular body 51 of the cage is a snap fit on the balls of the bearing, and the retainer ring 52 which faces the mouths of the ball pockets in the body 51 has slots which receive guide prongs on the body as a snap fit, as in the cage 20 of FIG. 1. The other retainer ring 52, which is located as a snap fit between the cylindrical walls 53, 54 by engagement of the lips 56, 57 in the recesses 62, 63 as described above, serves only the function of acting as a shield to prevent entry of foreign matter into the bearing. The bearing of FIG. 2 thus has the advantage over that of FIG. 1 that the bearing is protected against entry of foreign matter from both sides.

The cage illustrated in FIGS. 9 and 10 is similar to that shown in FIG. 1, except that the retainer ring 65 is formed with deflector bars 66 on its outside surface, that is the surface which is exposed when the cage is mounted in a bearing. The deflector bars are moulded integral with the retainer ring, but could if desired be separate components attached to the retainer ring. The deflector bars are inclined radially inwards relative to the direction of movement of the bars at any instant due to rotation of the retainer ring in operation, so that the deflector bars operate as flingers which tend to deflect away from the bearing any foreign matter which may settle on the retainer ring. The deflector bars preferably have a form, shape and angle of inclination to the direction of movement which are best suited to provide the maximum protection for the bearing in the environment in which the bearing is to operate.

In the cage of FIG. 2, the two retainer rings 52 may be formed with deflector bars 66 as shown in FIGS. 9 and 10.

The ball bearing of FIGS. 11 and 12 is fitted with a cage 70 which comprises an annular body 71 and a retainer ring 72. The annular body 71 has an outer cylindrical wall 73, an inner cylindrical wall 74, and an end wall 75 defining pockets 25 for the balls, all similar to the corresponding parts of the annular body 20 in the cage of FIG. 1. Part of the wall of each pocket 25 is formed by two opposing flanges 76, 77 which define the open mouth 29 of the pocket, and the part of the end wall 75 between adjacent pockets is formed with a guide prong 78 adapted to guide the balls into the pockets upon fitting of the cage to the bearing. The radially outer surface of the free end of each guide prong is cut away to form a step 79 and a recess 80 inboard of the step. The radially outer surface 81 of the step is inclined radially inwards in the axially outer direction as shown in FIG. 11, for a purpose described hereinafter. The retainer ring 72 comprises an annular disc 84 having a radial depth equal to that of the annular body 71, the radially outer periphery of the disc 84 being formed with an axially projecting flange 85 which is shaped to define a plurality of arcuate recesses 86 spaced at equal intervals around the disc, the number of recesses 86 being equal to the number of pockets 25 in the annular body of the cage. The part of the flange 85 between each pair of adjacent arcuate recesses 86 is formed with a tooth 87 which projects radially inwards, the distance between the tooth and the adjacent side of the disc 84 being slightly greater than the length of the step 79 on a guide prong 78. Each tooth 87 has a curved profile on the side remote from the disc 84.

The retainer ring 72 is fitted to the annular body 71 of the cage in a ball bearing by positioning the retainer ring 72 alongside the bearing with the arcuate recesses 86 facing the balls, and then introducing the retainer ring into the annular gap between the bearing rings. The teeth 87 ride up the inclined surfaces 81 on the steps 79 on the guide prongs of the annular body and are thereby deflected radially outwards. When the teeth ride off the steps 79 they snap into engagement with the recesses 80 on the guide prongs, and thereby lock the retainer ring onto the annular body. In this locked position, the parts 88 of the flange 85 which define the flanks of the arcuate recesses 86 on the retainer ring abut against the flanges 76, 77 defining the mouths of the pockets on the annular body and thereby prevent the flanges 76, 77 splaying apart under the effect of circumferential forces or inter-ball forces which may occur during operation of the bearing.

The ball bearing shown in FIGS. 13 and 14 is fitted with a cage having an annular body 71 which is the same as that of the cage in FIGS. 11 and 12, and a retainer ring 90 similar to that of the retainer ring 72 of the cage in FIGS. 11 and 12, and like parts are denoted by like reference numerals in the Figures. The retainer ring in FIGS. 13 and 14 comprises an annular disc 91 which has a thicker section than the annular disc 84 in FIGS. 11 and 12, and the annular disc 91 is formed with part-spherical recesses 92 into which the balls extend. This construction has the advantage that the overall width of the cage can be smaller than that of the cage of FIGS. 11 and 12, and /or the retainer ring can be increased in thickness to increase strength. The annular disc 91 is furthermore provided with sealing lips 93, 94 which are in sliding contact with the bearing rings 10, 11 respectively. Relative angular movement between the retainer ring and the annular body due to the frictional resistance of the sealing lips 93, 94 on the bearing rings is prevented by the engagement of the flanks 95 of the arcuate recesses 86 against the flanges 76, 77 defining the mouths of the pockets in the annular body.

The ball bearing shown in FIGS. 15 and 16 is fitted with a cage having an annular body 100 similar to the annular body 71 of the cage in FIGS. 11 and 12 and like parts are denoted by like reference numerals in the Figures. Each guide prong 101 is however provided on its radially outer surface with a recess 102 for reception of a metal ring 103 which prevents outward radial movement of the guide prongs and thereby retains the annular body in position with the bearing. The metal ring 103 is preferably arranged so that, after fitting on the guide prongs, it does not distort the prongs radially inwards.

The cage of FIGS. 15 and 16 also differs from that of FIGS. 11 and 12 in that the annular body is provided with sealing lips 104, 105, which are in sliding contact with the outer and inner bearing rings 10, 11 respectively.

The ball bearing shown in FIG. 17 is fitted with a cage having an annular body 110 which is the same as that of the cage in FIG. 1, and a retainer ring 111 similar to that of the retainer ring of the cage in FIG. 1, and like parts are denoted by like reference numerals in the Figures. The retainer ring 111 comprises an annular disc 112 similar to the disc 35 of the retainer ring in FIG. 1, except that the disc 112 is formed on its outer periphery with an axially-extending annular flange 113 which overlaps the radially outer surfaces of the guide prongs 31. The flange 113 prevents outward radial movement of the free ends of the guide prongs due to high ball-to-cage contact forces or centrifugal forces during operation of the bearing.

We claim:

1. A cage for separating the balls of a radial ball bearing, comprising an annular body of resilient plastics material having pockets for reception of the balls, the annular body being formed on one side thereof with a plurality of flanges arranged in pairs spaced around the body and with guide prongs arranged one between adjacent pairs of the flanges, each pair of flanges defining the mouth of a separate one of said pockets in the annular body, and the guide prongs being arranged to guide the balls into the mouths of the pockets upon fitting of the annular body into the bearing from a side thereof, the mouths of the pockets having a width less than the diameter of the balls, and the annular body being deformable by the force between the balls and the flanges upon fitting the annular body into the bearing so as to enlarge said mouths for introduction of the balls into the pockets as a snap fit, wherein the cage includes a retainer ring adapted to be mounted on said guide prongs to maintain substantially the same chord distance between the guide prongs and thereby restrict deformation of the annular body and prevent disengagement of the annular body from the balls due to the contact forces between the balls and the annular body during operation of the bearing.

2. A cage as claimed in claim 1, wherein the outer ends of the guide prongs have bulbous enlargements and the retainer ring is formed with slots adapted to receive the guide prongs as a snap fit.

3. A cage as claimed in claim 1, wherein the radially outer surface of each of said guide prongs is formed with a recess and the retainer ring is formed with teeth adapted to engage as a snap fit in said recesses.

4. A cage as claimed in claim 1, wherein the radially outer surface of each of the guide prongs is formed with a recess and the retainer ring is mounted in said recesses.

5. A cage as claimed in claim 1, wherein the retainer ring engages the outer surfaces of said flanges and prevents or restricts relative movement between the two flanges of each pair of flanges away from one another.

6. A cage as claimed in claim 5, wherein each of said flanges co-operates with the adjacent guide prong to define a recess in the annular body, and the retainer ring is formed with projections which extend into the recesses and engage against the associated guide prong and flange.

7. A cage as claimed in claim 3, wherein the retainer ring is formed with flanges adapted to overlap the radially outer surfaces of said flanges on the annular body so as to prevent or restrict outward radial movement of the flanges on the annular body during operation of the bearing.

8. A cage as claimed in claim 1, wherein the outer side of the retainer ring facing away from the annular body when mounted thereon is provided with projections arranged to propel any foreign matter in contact therewith away from the cage upon rotation thereof during operation in a bearing.

9. A cage as claimed in claim 8, wherein said projections on the outer side of the retainer ring comprise deflector bars each inclined relative to a radial plane through the bar.

10. A cage as claimed in claim 1 and fitted in a ball bearing having inner and outer bearing rings rotatably mounted relative to one another by the balls, wherein the retainer ring is spaced with small clearance from the inner and outer bearing rings so as to provide a shield which restricts entry of foreign matter into the bearing from the side thereof fitted with the retainer ring.

11. A cage fitted in a ball bearing as claimed in claim 10, wherein the annular body of the cage has a radially inner cylindrical wall, a radially outer cylindrical wall, and an end wall which extends between the cylindrical walls and is shaped to define said pockets, the annular space between the cylindrical walls being open on the side remote from the mouths of the pockets, and a shield has an annular portion thereof mounted in the annular space between the cylindrical walls and a disc-shaped portion which is spaced with small clearance from the inner and outer bearing rings.

12. A cage fitted in a ball bearing as claimed in claim 11, wherein said annular portion of the shield is formed with outwardly facing abutments and said cylindrical wall of the annular body have flexible lips which engage said outwardly facing abutments on the annular portion of the shield to hold the shield in position on the annular body.

13. A cage fitted in a ball bearing as claimed in claim 10, wherein the retainer ring is formed with annular lips which make contact with the outer and inner bearing rings so as to provide a seal against entry of foreign matter into the bearing from the side thereof fitted with the retainer ring.

14. A cage fitted in a ball bearing as claimed in claim 10, wherein the annular body is formed with annular lips which make contact with the outer and inner bearing rings so as to provide a seal against entry of foreign matter into the bearing from the side thereof fitted with the annular body.

* * * * *